United States Patent [19]

Wedeniwski

[11] Patent Number: 4,885,874
[45] Date of Patent: Dec. 12, 1989

[54] METHOD OF GRINDING TWO OR MORE CAMS OF A CAMSHAFT

[75] Inventor: Horst J. Wedeniwski, Remshalden-Grunbach, Fed. Rep. of Germany

[73] Assignee: Fortuna-Werke Maschinenfabrik GmbH, Fed. Rep. of Germany

[21] Appl. No.: 149,108

[22] Filed: Jan. 27, 1988

[30] Foreign Application Priority Data

Jan. 29, 1987 [DE] Fed. Rep. of Germany ....... 3702594

[51] Int. Cl.$^4$ .............................................. B24B 29/00
[52] U.S. Cl. ................................ 51/165.77; 51/281 C
[58] Field of Search ......... 51/165.77, 281 C, 105 EC, 51/101 R, 105 R, 165.71, 165.91, 165.9

[56] References Cited

U.S. PATENT DOCUMENTS

| 3,964,210 | 6/1976 | Moritomo | 51/165.77 |
| 4,061,952 | 12/1977 | Dinsdale et al. | 318/572 |
| 4,346,535 | 8/1982 | Asano et al. | 51/105 EC |

FOREIGN PATENT DOCUMENTS

| 2621430 | 5/1976 | Fed. Rep. of Germany . |
| 52-44493 | 6/1975 | Japan . |
| 52-144895 | 5/1976 | Japan . |

OTHER PUBLICATIONS

Wedeniwski, Horst Josef: "Prozessrechnergesteuertes Produktions—Nockenschleifen", Literature Werkstatt und Betrieb, 1985, vol. 8, pp. 443–448.
Wedeniwski, Horst Josef: "Rechnergestützte Programmierung beim CNC-Nockenform-Schleifen", Literature Werkstatt und Betrieb, 1986, vol. 8, pp. 655–660.
Brill, J.; Chmielnicki, S.; Roos, G · "CNC-Gesteuertes Nockenschleifen", Literature: wt Zeitschrift für industrielle Fertigung, 1986, vol. 6, pp. 343–348.

Primary Examiner—Frederick R. Schmidt
Assistant Examiner—Maurina Rachuba
Attorney, Agent, or Firm—Walter A. Hackler

[57] ABSTRACT

A method serves for grinding two or more cams of a camshaft. Initially the camshaft is chucked in a mounting position between a driver of a work headstock seated to rotate about a first axis (C axis), and a footstock. Then the camshaft is rotated in a defined rotary angle/time relationship. A rotating grinding wheel is advanced in the direction of a second axis (X axis) extending perpendicularly to the said first axis (C axis), the movement of the rotating grinding wheel being directed towards a first cam to be ground. The rotary angle and length of travel (x) of the grinding wheel are adjusted in response to the polar coordinates of a nominal contour of the cam, supplied by a numerical control, while the grinding wheel is in engagement with the cam. Any deviation from a nominal process value is measured. The pre-determined length of travel is corrected by a correcting value ($\Delta x$) corresponding to the weighted deviation.

In order to compensate all influence that may lead to errors, with the least possible cost input, the dimensions of the contour of the cam ground first are measured. Any deviations between the values determined by measuring and the nominal values of the dimensions of the contour are determined, and the length of travel (x) is weighted with a correction factor. Finally, a second and subsequent cams are ground the same mounting condition.

7 Claims, 3 Drawing Sheets

METHOD OF GRINDING TWO OR MORE CAMS OF A CAMSHAFT

The present invention relates to a method of grinding two or more cams of a camshaft comprising the process steps of chucking the camshaft in a mounting position between a driver of a work headstock seated to rotate about a first axis, and a footstock;

rotating the camshaft in a defined rotary angle/time relationship;

advancing a rotating grinding wheel in the direction of a second axis extending perpendicularly to the said first axis, towards a first cam to be ground;

adjusting the rotary angle and length of travel of the grinding wheel in response to the polar coordinates of a nominal contour of the cam, supplied by a numerical control, while the grinding wheel is in engagement with the cam;

measuring any deviation from a nominal process value; and correcting the pre-determined length of travel by a correcting value corresponding to the weighted deviation.

A method of this type has been known before from German Patent Specification No. 26 21 430.

According to the known method, the actual diameter of the grinding wheel is measured in a manner not described in detail, and the measured value is supplied to an electronic control unit which derives a correcting signal for both, the length of travel of the wheel carriage and the rotary angle position of the camshaft from the difference between the originally programmed diameter of the grinding wheel and the diameter actually measured.

Accordingly, the known method allows only for those error influences which result on the one hand from the fact that the grinding wheel is on the one hand subjected to wear during the working processes and on the other hand from the circumstance that its diameter is further reduced as a result of dressing operations which are usually performed at certain intervals on grinding wheels for sharpening their surface. As to the other process parameters that may lead to deviations of the actual contour of the ground cams from a nominal contour, these are not allowed for. Further, the known method requires that for measuring the diameter of the grinding wheel the latter must be stopped, which results in losses in time when working the cams of a camshaft.

The German magazine "Werkstatt und Betrieb", 118 (1985), describes on pages 443 to 448 a method for process computer controlled production cam grinding. In the case of this known method, one establishes initially a control program for the CNC grinding machine which contains a description of the geometry of the workpieces to be produced. Then a workpiece, for example a cam, is ground in a test run, using the program so established. One then measures the ground sample cam to determine any errors in shape, i.e. any deviations from the theoretically pre-determined geometry of the cam elevation, and the measured values reflecting the deviations of the cam shape from an ideal cam shape are recorded. The absolute dimensions of the cam are not considered in the measurements because only the deviations from a given ideal cam shape are of interest. One then corrects the program using these deviations and performs, if necessary, a second sample grinding process to verify if the correcting program now actually leads to cams of a shape sufficiently approximated to an ideal cam shape.

Once it is determined that the deviations from the ideal cam shape remain within pre-determined tolerances, the program, which has been corrected in this manner once or several times, is released for series production.

Although this known method provides the advantage that it finally leads to cams of an almost ideal cam shape, two issues remain unsolved.

On the one hand, the known method does not ensure that the cams which are produced according to an ideal cam shape exhibit with safety the nominal absolute dimensions because, as mentioned before, only relative deviations from an ideal shape are corrected during the program correcting process.

On the other hand, the known method is not capable of allowing for any changes occurring during operation of the grinding machine in series production.

Other similar methods have been known also from the German magazine "Werkstatt und Betrieb", 119 (1986), pages 655 to 660, and the German magazine "wt Zeitschrift für industrielle Fertigung", 76 (1986), pages 343 to 348. This method for CNC grinding of cams also permits at best to allow for a relative deviation from an ideal cam shape, and this only in the programing phase, i.e. during preparation of a program intended to be used later in series production.

Now, it is the object of the present invention to improve a method of the type described above so that it will be possible in future not only to consider the absolute values of the desired geometry, but also to allow for any influences in this regard that may produce themselves only in practical use of the method, during series production of the camshafts.

This object is achieved according to the invention by the steps of measuring the dimensions of the ground contour of the cam ground first, determining any deviations between the values determined by measuring and the nominal values of the dimensions of the contour, weighting the length of travel in response to such deviations with a correction factor, and grinding thereafter a second and subsequent cams in the same mounting condition.

This solves the object underlying the invention fully and perfectly.

By measuring the absolute dimensions of the cam ground first of a cam shaft, all influences that have led to deviations between the dimensions of the cam ground and the pre-determined values are properly allowed for. Accordingly, the method according to the invention is systematically dependent on the absolute dimensions of the cam shaft blanks supplied because the cam blanks are not only ground to an ideal cam shape, but exhibit also exactly the pre-determined dimensions. Contrary to the prior art, this is achieved by the fact that the cam ground first is checked for these absolute dimensions and, if necessary, correcting values for the grinding process of the subsequent cams are determined and allowed for during the grinding process itself, i.e. with the camshaft in the mounted condition. Thus, the camshaft remains unchanged in its mounting position during the measuring and correcting process, which means that the method according to the invention is an in-process method, while the prior art methods described above come into play as preparatory measures, during establishment of the control program for the grinding machine itself.

Contrary to the method described above, the method according to the invention, therefore, allows for all factors of influence, including variations in the diameter of the grinding wheel, without the need to interrupt the working process for this process, because usual measuring sensors can be applied without any problems to the stationary or slowly rotating surface of the cam, while this is of course not possible for the surface of a grinding wheel, for example. Also, the grinding wheel need not be stopped, which would lead to considerable delays and losses in time, considering the very high speeds of modern precision grinding machines.

Finally, the correcting value is determined, according to the method of the invention, in a very simple manner by weighting with a correcting factor, i.e. be a simple multiplication operation, and only the length of travel is determined, while the rotary angle/time relationship (C axis) remains unchanged.

According to certain preferred embodiments of the invention, either the diameter of the base circle of the cam, or the latter's elevation is determined by the measurements.

This feature is of particular advantage because these two figures are characteristic values of the cam from which one derives the polar coordinate control during grinding of the contour of the cam. In addition, these two characteristic values of the cam lend themselves for measuring by means of simple measuring instruments.

According to a first variant of the method according to the invention, the first cam is moved into a pre-determined rotary position after completion of the grinding process, by a corresponding rotation of the driver, and the values to be measured are picked up by measuring sensors in this predetermined rotary position.

This feature provides the advantage that particularly simple measuring sensors can be used which only have to be moved from a pre-determined rest position into a stationary measuring position.

According to another variant of the method according to the invention, the first cam is rotated by the driver by preferably 360°, after completion of the grinding process, with the measuring sensors applied to the ground contour during such rotation, and the values to be measured are derived from the development in time of the signals supplied by the measuring sensors.

This feature provides the advantage that although the measuring sensors have to meet some stricter demands, which means that they must be seated suitably to permit them to follow the contour of the rotating cam, even higher measuring accuracy is achieved because slight variations of the measured values of the contour are averaged out. In addition, possible errors of the type that may be encountered during stationary measurements if the measuring sensors are not absolutely free from play, are also averaged out.

A particularly preferred embodiment of the method according to the invention distinguishes itself by the fact that the pre-determined length of travel is corrected by the correcting value while a second cam to be ground and the grinding wheel are moved into alignment relative to each other.

For, this feature provides the advantage that the compensation is effected during the so-called "indexing" of the camshaft, i.e. while the machine switches from a first to a second cam to be worked, so that insofar no time is lost.

Other advantages of the invention will become apparent from the specification and the attached drawing.

It is understood that the features that have been mentioned before, and that will be described hereafter, may be used not only in the described combinations, but also in any other combination or individually, without leaving the scope of the present invention.

Certain embodiments of the invention will now be described in detail with reference to the drawing in which FIG. 1 shows a very diagrammatic overall view of a cam grinding machine according to the invention;

Figure 1:
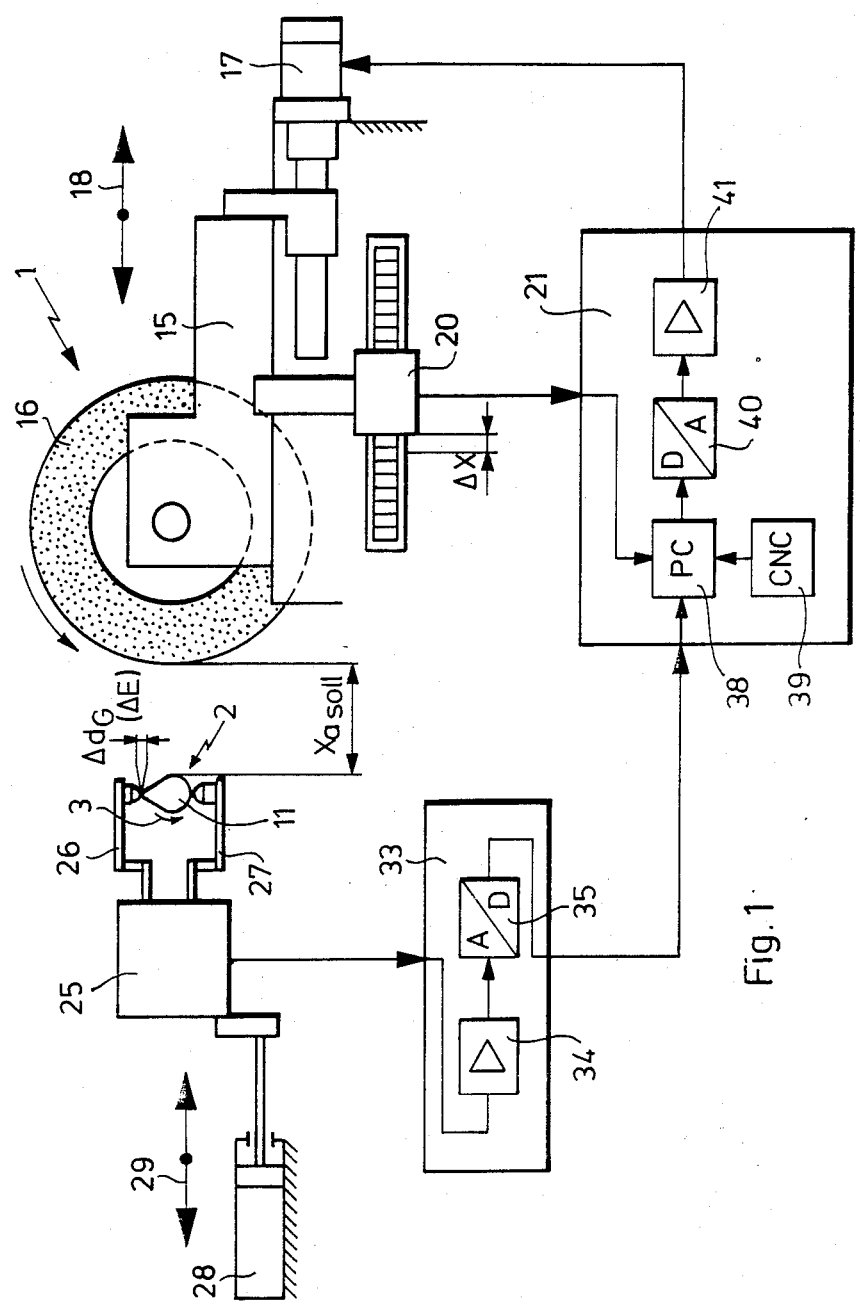
Figure 2:
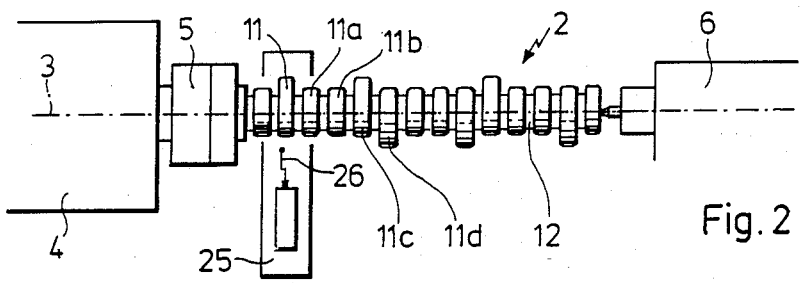
FIG. 2 shows a top view of a detail of a machine according to FIG. 1.

In FIGS. 1 and 2, a cam grinding machine for grinding the cams of a camshaft 2 is designated generally by reference numeral 1. The camshaft 2 can be rotated about its longitudinal axis, the so-called C axis. To this end, the camshaft 2 is mounted on its one end in a driver 5 of a work headstock, while its other end is seated in a footstock 6.

The cams 11 are ground according to a given contour at their surface extending in parallel to the C axis 3. This is effected by a rotating grinding wheel 16 arranged on a wheel carriage 15 which can travel along a so-called Y axis 18 extending perpendicularly to the C axis 3, by means of a first drive system 17.

A length-measuring device 20, whose output signals can be supplied to an electronic control unit 21, is coupled with the wheel carriage 15.

In the area of the cam 11, there is provided a profile measuring device 25 comprising, for example, an upper measuring sensor 26 and a lower measuring sensor 27 which engage the cam 11 at opposite points. The measuring sensors 26, 27 exhibit, conveniently, a bent-off design so that the profile measuring device 25 can be accommodated within very limited space without getting into conflict with the adjacent cams 11a, 11b, 11c, 11d....

The profile measuring device 25 can be displaced along a Z axis 29 extending parallel to the X axis, by means of a second drive system 28.

The output signals of the profile measuring device 25 are supplied to a measuring unit 33 where they are passed through an amplifier 34 and an analog-to-digital converter 35 before being supplied to the electric control unit 21 where the amplified and digitalized measuring values received from the profile measuring device 25 are input into a data processor 38 which is in addition supplied with the measuring signals received from the length-measuring device 20. The data processor 38 is further actively connected to a numerical control unit 39 in which the polar coordinates of a nominal contour of the cam 11 are stored.

An output of the data processor 38 is connected to a digital-to-analog converter 40 which acts on the first drive system 17 for the wheel carriage 15 via an amplifier 41.

Figures 3, 4, 5:
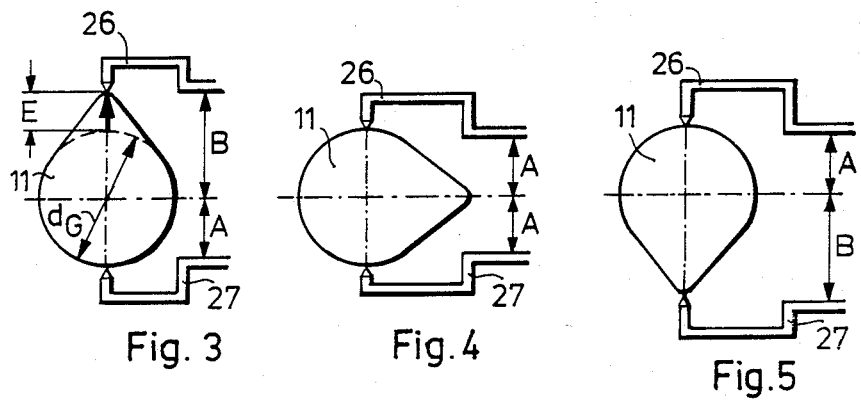
FIGS. 3 to 5 show three phase diagrams illustrating the process of picking up measuring values on a cam.

FIG. 3 shows an enlarged detail illustrating a first possibility of measuring characteristic values of the contour of the cam 11. As is generally known, a common cam contour consists of a base circle of larger diameter and a secondary circle of smaller diameter, the base circle and the secondary circle being spaced relative to each other and interconnected by tangents to the circles. One then obtains, as characteristic measuring values, the base circle diameter $d_G$ and the maximum elevation E, which is the spacing between the base circle and the vertex of the secondary circle.

FIG. 3 shows that measuring values A and B corresponding to half the base circle diameter $d_G$, and half the base circle diameter $d_G$ plus the elevation value E, can be obtained with one setting of the measuring sensors 26, 27.

Similarly, a setting according to FIG. 2 supplies two measuring signals A the sum of which corresponds to the base circle diameter $d_G$. FIG. 5 shows a third setting where values opposite to those of FIG. 3 are obtained.

It is now possible either to determine the two interesting characteristic values $d_G$, or $d_G+E$, separately by static measurements according to FIG. 3 or 4, or to carry out all three measurements according to FIGS. 3 to 5, in which case any measuring errors that may occur can be averaged out by corresponding comparisons. Further, it is also possible to let the cam 11 rotate slowly, in which case the measuring sensors 26, 27 must be seated resiliently to permit them to follow the changing points of contact along the contour of the cam 11. Then, the characteristic values $d_G$, and $d_G+E$, can be derived from the development in time of the measuring values picked up by the measuring sensors 26, 27, or from their minima and maxima.

According to the invention, one of the measuring values $d_G$, or $d_G+E$, is sufficient to carry out the compensation provided for by the invention.

Figure 6:
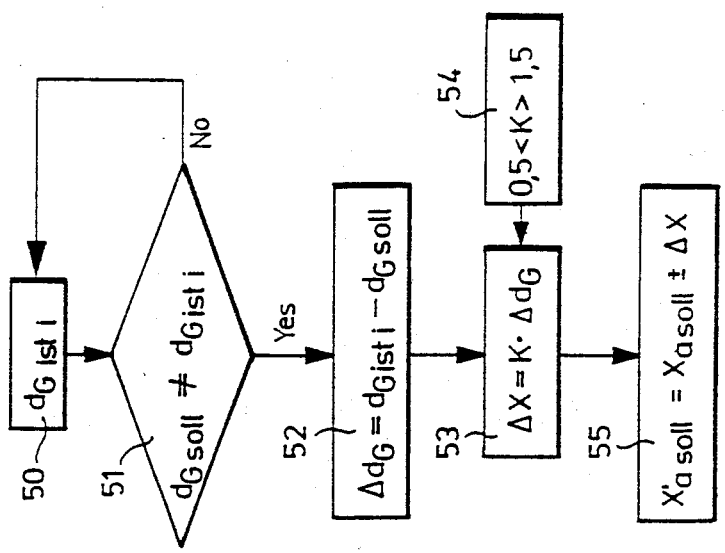

According to a first variant one proceeds in the manner illustrated by the flow diagram of FIG. 6.

One can see in a first block 50 that a particular actual value of the base circle diameter $d_{G\ act\ i}$ has been determined in the $i^{th}$ measuring cycle, for which purpose one of the positions shown in FIGS. 3 to 5, and there the measuring value A, was evaluated. The second block 51 of FIG. 6 symbolizes the question if the actual value $d_{G\ act\ i}$ so determined conforms with a pre-determined nominal value $d_{G\ nom}$. If the answer is no, the difference $\Delta d_G$ is formed in the third block 52, and in the fourth block 53 this difference $\Delta d_G$ is weighted by multiplying it with a constant factor K, the latter being in the range of between 0.5 and 1.5. The result is a correcting value $\Delta x$ which is added to or subtracted from an output nominal value $x_a$ so that a new output nominal value $x_a$ is obtained for the length of travel of the wheel carriage 15.

Figure 7:
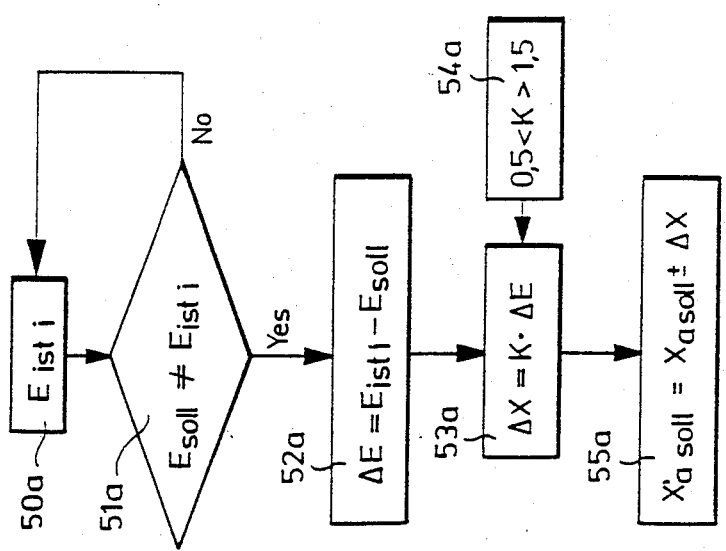
FIGS. 6 and 7 show two diagrams illustrating certain methods according to the invention.

FIG. 7 illustrates analogously the procedure in case the base circle $d_G$+the elevation E has been selected instead of the base circle diameter $d_G$. The procedure corresponds exactly to that illustrated in FIG. 6, and the corresponding blocks are designated by the same reference numerals, with the addition of an a.

Figure 8:
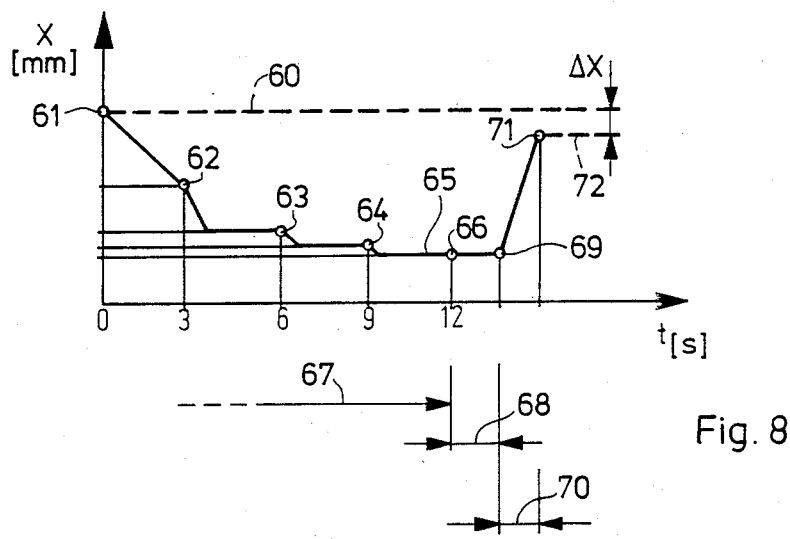
FIG. 8 shows a path/time diagram illustrating the travel performed by the wheel carriage during execution of the method according to the invention.

Finally, FIG. 8 illustrates by way of a path/time diagram how the grinding wheel 16 advances along the x axis 18, carrying out gradually the grinding process.

A starting point, i.e. a first raw dimension, is symbolized by the dashed line 60 and the first working point 61. Starting from the first working point 61, the wheel carriage 15 carrying the grinding wheel 16 is now moved towards the C axis 3, the second working point 62, the third working point 63 and the fourth working point 64 with the level curve sections preceding them symbolizing the different coarse grinding and finishing steps. After the fourth working point 64 has been left, the pre-determined nominal dimension is reached at 65. This last grinding step takes up to 12 seconds in the illustration of FIG. 8, after which time the fifth working point 66 is reached and a full grinding interval 76 is completed.

Now, the contour of the cam 11 is measured during a subsequent measuring interval 68, in the manner described before (explanations referring to FIGS. 3 to 5), with the grinding wheel 16 remaining, for example, in the x position of the fifth working point 66.

At the end of the measuring interval 68, the grinding wheel is returned, in a correcting interval 70, from a sixth working point 69 to a seventh working point 71 which is spaced, in the x direction, from the first raw dimension 60 by exactly the distance $\Delta x$ corresponding to the correcting value that has been determined by one of the procedures explained with reference to FIGS. 6 or 7.

One obtains in this manner a second raw dimension 72 which, in the example of FIG. 8, is smaller than the first raw dimension 60 so that the second cam 11b to be worked and all subsequent cams 11c, 11d . . . will be worked starting out from the corrected second raw dimension 72.

During performance of the procedural steps illustrated in FIG. 8, different adjustments of the cam grinding machine 1 may be provided.

According to a first variant of the method according to the invention, the measuring cycle for the contour of the cam 11 is initiated by advancing the profile-measuring device 25 to the cam 11, by means of the second drive system 28, while the cam 11 performs its last rotation, shortly before the fifth working point 66 is reached at the end of the grinding interval 67. Immediately thereafter, the necessary measurement is performed while the cam 11 continues to rotate, the wheel carriage is retracted, as indicated in FIG. 8 by the sixth working point 69 and the seventh working point 71, while at the same time a transfer device not shown in the drawing "indexes" the camshaft 2, i.e. displaces it in the representation 2 to the left by one cam spacing, so that the grinding wheel is now aligned with the cam 11a, 11b . . . to be ground next.

According to another variant of the method according to the invention, the grinding wheel 16 is moved away from the cam 11 when the sixth working point 69 is reached, and the cam 11 is rotated in a defined manner into its measuring position according to one of FIGS. 3 to 5. In this case the profile-measuring device 25 is again first advanced to, and then moved away from the cam 11 by operation of the second drive system 27.

The grinding wheel 16 which has been retracted in this variant of the method according to the invention, for example to the position of the first raw dimension 60, while at the same time the camshaft 2 was indexed and the correcting value $\Delta x$ was calculated, can now be advanced by this correcting value $\Delta x$ to the seventh working point 71 corresponding to the second raw dimension 72.

I claim:

1. A method of grinding a plurality of cam surfaces on a camshaft, the method comprising the steps of:
defining polar coordinates and a nominal value of a nominal contour of said plurality of cams and storing said coordinates and said nominal value in a memory of a numerical grinding machine control, said nominal value being equivalent to an absolute dimension of said cams at a predetermined position of said surface;

chucking said camshaft in a mounting position between drive means of a workpiece headstock and a tailstock, said drive means being rotatable about a first axis;

rotating said drive means with said camshaft in a first relationship defining a camshaft rotary angle about said first axis versus time;

advancing a rotary grinding wheel along a second axis in a second releationship defining a grinding wheel linear travel along said second axis versus time, said second axis extending perpendicularly to said first axis and being directed towards a first cam surface to be ground on said camshaft, said first and second releationships being defined with respect to each other such as to make a grinding surface portion of said grinding wheel engage said cam surface and follow said nominal contour;

grinding said first cam surface along said nominal contour while rotating said camshaft by 360°;

after grinding said first cam surface measuring an actual value of said absolute dimension at said predetermined position on said first cam surface, with said camshaft being still chucked between said headstock and said tailstock;

comparing said actual value with said nominal value and generating an error signal being equal to a constant multiplied with a difference between said actual value and said nominal value;

adjusting said second relationship by multiplying said linear travel by said error signal;

displacing relative positions of said camshaft and said grinding wheel along said first axis to make said second axis being directed towards a second cam surface to be ground on said camshaft; and advancing said grinding wheel along said second axis in said adjusted second relationship with said camshaft being still chucked between said headstock and said tailstock and rotated in said first relationship in order to grind said second cam surface.

2. The method of claim 1, wherein said nominal value corresponds to a base circle diameter of said cam.

3. The method of claim 1, wherein said nominal value corresponds to a base circle diameter of said cam plus a cam elevation value.

4. The method of claim 1, wherein said first cam after completion of said grinding along said nominal contour is moved into a predetermined rotary position by a corresponding rotation of said drive means, and said actual value is measured by measuring sensors in said predetermined rotary position.

5. The method of claim 1, wherein said first cam after completion of said grinding along said nominal contour is rotated by corresponding rotation of said drive means by 360° with measuring sensors applied to the ground surface during such rotation, and said actual value to be measured is derived by sampling an output signal of said sensors.

6. The method of claim 1, wherein said second relationship is adjusted while said second cam to be ground and said grinding wheel are displaced into alignment relative to each other.

7. A method for grinding a plurality of cams on a camshaft comprising the steps of:

chucking the camshaft between a chucking device rotatable about a first axis of a workpiece spindle stock and a footstock controlling the angle of rotation of the camshaft in a predetermined angle vs. time dependency and, simultaneously controlling the displacement (x) of the grinding wheel in the direction of a second axis, being directed perpendicular to the first axis in a direction to a cam to be ground, the control being made depending on predetermined polar coordinates of a given outline of the cam stored in a numerical control unit;

measuring the base circle diameter ($d_G$) or the sum of the base circle diameter ($d_G$) and of the maximum elevational value (E) of the ground cam outline;

determining a deviation ($\Delta d_G$ or $\Delta(d_G+E)$) between the measured values ($d_{Gi}$, $(d_G+E)_i$) and predetermined values ($d_{Gi}$, $(d_G+E)_i$) and predetermined values ($d_{G\ nom}$), $(d_G+E)_{nom}$;

modifying the displacement (x) value by the deviation ($\Delta x = K \frac{1}{2} \Delta d_G$; or $\Delta x = K \frac{1}{2} \Delta (d_G+E)$), where K is a correction constant; and subsequently grinding another cam.

* * * * *